(12) United States Patent
Junge et al.

(10) Patent No.: US 10,139,658 B2
(45) Date of Patent: Nov. 27, 2018

(54) LAYER ARRANGEMENT FOR THE REGULATION OF LIGHT TRANSMISSION

(75) Inventors: Michael Junge, Pfungstadt (DE); Andreas Beyer, Hanau (DE)

(73) Assignee: MERCK PATENT GMBH, Darmstadt (DE)

( * ) Notice: Subject to any disclaimer, the term of this patent is extended or adjusted under 35 U.S.C. 154(b) by 238 days.

(21) Appl. No.: 14/237,649

(22) PCT Filed: Jul. 13, 2012

(86) PCT No.: PCT/EP2012/002962
§ 371 (c)(1),
(2), (4) Date: Feb. 7, 2014

(87) PCT Pub. No.: WO2013/020629
PCT Pub. Date: Feb. 14, 2013

(65) Prior Publication Data
US 2014/0218650 A1 Aug. 7, 2014

Related U.S. Application Data

(60) Provisional application No. 61/526,783, filed on Aug. 24, 2011.

(30) Foreign Application Priority Data

Aug. 8, 2011 (EP) .................................... 11006502

(51) Int. Cl.
*G02F 1/13* (2006.01)
*G02F 1/01* (2006.01)
(Continued)

(52) U.S. Cl.
CPC ................ *G02F 1/132* (2013.01); *E06B 9/24* (2013.01); *G02B 5/208* (2013.01); *G02B 5/3025* (2013.01);
(Continued)

(58) Field of Classification Search
CPC .. G02F 1/132; G02F 1/0147; G02F 1/133528; G02F 2203/11; G02F 1/133636;
(Continued)

(56) References Cited

U.S. PATENT DOCUMENTS 5,686,979 A   11/1997 Weber et al.
6,049,419 A   4/2000 Wheatley et al.
(Continued)

FOREIGN PATENT DOCUMENTS

CN   101802679 A   8/2010
CN   101881902 A   11/2010
(Continued)

OTHER PUBLICATIONS

International Search Report dated Sep. 20, 2012 issued in corresponding PCT/EP2012/002962 application (pp. 1-4).
(Continued)

*Primary Examiner* — Jessica M Merlin
(74) *Attorney, Agent, or Firm* — Millen White Zelano and Branigan, PC; John Sopp (57) ABSTRACT

A layer arrangement (1) which changes the transmission of incident light depending on its temperature, where the layer arrangement (1) has a first polarization layer (5a), a switching layer (2) which influences the polarization properties of light depending on the temperature, and a second polarization layer (5b), whereby both the first polarization layer (5a) and the second polarization layer (5b) are arranged to affect polarization both in the VIS region and in the NIR region.

4 Claims, 5 Drawing Sheets

(51) Int. Cl.
  *G02F 1/1335* (2006.01)
  *E06B 9/24* (2006.01)
  *G02B 5/30* (2006.01)
  *G02B 5/20* (2006.01)
(52) U.S. Cl.
  CPC ...... *G02F 1/0147* (2013.01); *G02F 1/133528* (2013.01); *E06B 2009/2417* (2013.01); *G02F 2203/11* (2013.01)
(58) Field of Classification Search
  CPC ... E06B 9/24; E06B 2009/2417; G02B 5/208; G02B 5/3025
  See application file for complete search history.

(56) References Cited

U.S. PATENT DOCUMENTS

| | | | |
|---|---|---|---|
| 6,072,549 A * | 6/2000 | Faris | B82Y 15/00 349/113 |
| 6,451,414 B1 | 9/2002 | Wheatley et al. | |
| 7,755,829 B2 | 7/2010 | Powers et al. | |
| 7,973,998 B2 | 7/2011 | Xue | |
| 8,072,672 B2 | 12/2011 | Powers et al. | |
| 8,755,105 B2 | 6/2014 | Powers et al. | |
| 2004/0246418 A1* | 12/2004 | Kumagai | G02F 1/133636 349/117 |
| 2007/0218217 A1* | 9/2007 | Fernando | C09K 19/586 428/1.31 |
| 2009/0015902 A1 | 1/2009 | Powers et al. | |
| 2009/0167971 A1 | 7/2009 | Powers et al. | |
| 2009/0219603 A1 | 9/2009 | Xue | |
| 2010/0118380 A1 | 5/2010 | Xue | |
| 2010/0271686 A1 | 10/2010 | Powers et al. | |
| 2011/0102878 A1* | 5/2011 | McCarthy | G02B 5/208 359/288 |
| 2012/0002264 A1 | 1/2012 | Xue | |
| 2012/0140311 A1 | 6/2012 | Powers et al. | |
| 2015/0070746 A1 | 3/2015 | Powers et al. | |

FOREIGN PATENT DOCUMENTS

| | | |
|---|---|---|
| EP | 1055140 B1 | 9/2002 |
| EP | 0835475 B1 | 9/2004 |
| WO | 2009/009770 A1 | 1/2009 |
| WO | 2009/143172 A2 | 11/2009 |
| WO | 2011/053853 A2 | 5/2011 |

OTHER PUBLICATIONS

English Abstract of CN 101802679 A published Aug. 11, 2010.
Machine Translation of CN 101881902—Publication Date: Nov. 10, 2010—"Type optical amplitude addressed liquid crystal light valve apparatus and its preparation method".

* cited by examiner

LAYER ARRANGEMENT FOR THE REGULATION OF LIGHT TRANSMISSION

The present invention relates to a layer arrangement which changes the transmission of light depending on its temperature, where the layer arrangement has a first polarization layer, a switching layer which influences the polarization properties of light depending on the temperature, and a second polarization layer.

The layer arrangement can be used in accordance with the invention in or on windows or comparable openings to building interiors, such as, for example, glazed doors. Furthermore, the layer arrangement can be employed in or on walls or roofs.

For the purposes of this invention, the term interior is intended to be taken to mean both interiors of private, public or commercial buildings or those used for office purposes as well as interiors of vehicles. Furthermore, it is intended to be taken to mean any desired large receptacles, for example shipping containers. Furthermore, the term window in the sense of this invention is intended to be taken to mean any desired openings in buildings or vehicles which are transparent to light and are sealed with solid material.

The term incident light in the sense of this invention is taken to mean the flow of electromagnetic radiation which emanates from the sun, hits the earth after passing through the atmosphere and is only absorbed to a slight extent, or not at all, by uncoated glass sheets, so that incident light coming from the sun can pass through glass sheets into an interior. Since short-wave UV radiation (UV-B light) and long-wave infrared radiation is absorbed by the atmosphere or by glass sheets, incident light accordingly essentially encompasses a long-wave UV radiation region (UV-A light), electromagnetic radiation in the visible region (VIS light) and the short-wave infrared radiation region (NIR light).

According to definitions usually used in the area of optics, UV-A light is for the purposes of the present application taken to mean, in particular, light having a wavelength of 320 to 380 nm, VIS light is taken to mean, in particular, light having a wavelength of 380 to 780 nm, and NIR light is taken to mean, in particular, light having a wavelength of 780 to 3000 nm.

Modern buildings are distinguished by a high proportion of glass surfaces, which is highly desired both for aesthetic and architectural reasons and also with respect to the brightness and comfort of the interiors. It has become equally important in recent years that buildings which are used for living or office purposes and/or are accessible to the public should have the highest possible energy efficiency. This means that in temperate climatic zones, as little energy as possible should be used for heating purposes in the cold season and no or only little air conditioning of the interiors should be necessary in the warm season. However, extensive glass surfaces are counterproductive in achieving these aims.

On the one hand, glass surfaces result in undesired heating of the interiors in the case of warm outside temperatures if intense insulation is additionally present, since they are transparent to radiation in the VIS and NIR regions of the electromagnetic spectrum. Objects in the interior absorb the radiation allowed through and are thereby warmed, which results in an increase in the room temperature (greenhouse effect).

With the increasing importance of energy efficiency of buildings, there is a growing demand for special devices or coatings arranged directly on window surfaces which control the energy flow through the windows. With respect to low production and operating costs and low space requirement, suitable coatings are advantageous. In particular, there is a demand for coatings which are able to match the energy flow through windows in a suitable manner to the conditions prevailing at the particular point in time (heat, cold, high insulation, low insulation).

The prior art discloses both non-switchable coatings (layer arrangements), which limit the energy flow, but are unable to adapt it in a variable manner, and also switchable coatings, which are able to match the energy flow to the respective conditions prevailing. Amongst the switchable devices, a distinction can be made between coatings which do not adapt automatically to the ambient conditions and coatings which do adapt automatically to the ambient conditions. Windows having the latter coatings are also known as intelligent windows (smart windows).

In order to improve the thermal insulation of windows, multiglazed window units (multipane insulating glass, insulated glass units) have been known for some time. The prior art furthermore discloses the coating of window panes with thin metal or metal-oxide layers. The coating can regulate the flow of radiation energy in two ways: on the one hand it reduces the transmissivity of the glass for light, and on the other hand it reduces the emissivity of the glass panes.

If the flow of radiation energy is controlled exclusively by the coating technique presented, no adaptation to varying weather or seasonal conditions is possible. For example, it would be of interest for windows to be totally transparent to incident sunlight in the cold season in order to reduce the energy expenditure for heating. Conversely, low emissivity of the windows is unnecessary or disadvantageous in the case of warm outside temperatures, since the greenhouse effect described above is thus augmented.

There is therefore a demand for coatings in which the flow of radiation energy can be matched to the respective conditions prevailing. In particular, there is a demand for coatings which are able to adapt automatically to the ambient conditions.

The prior art discloses coatings which can be switched reversibly from a transparent state to a less-transparent, for example opaque, or substantially non-transparent state on application of an electrical voltage.

An example of such coatings is electrochromic devices, which are presented, inter alia, in Seeboth et al., Solar Energy Materials & Solar Cells, 2000, 263-277.

Although the coatings mentioned enable adjustment of the flow of radiation energy, they have, however, the disadvantage that they have to be electrically controlled. The introduction of electrical components, such as, for example, power supplies and control devices, into windows is accompanied by additional costs in the production of the windows and entails the risk of susceptibility to faults and the low durability of coatings of this type. Furthermore, significant construction effort is necessary in many cases to achieve an electrical connection of the windows.

US 2009/0015902 and US 2009/0167971 disclose layer arrangements which have a switching layer between two polarization layers, where the switching layer rotates the plane of polarization of the incident light at a first temperature and rotates the plane of polarization of the incident light only insignificantly or not at all at a second temperature. Through a permanent rotation of the planes of polarization of the polarization layers with respect to one another, it can thus be achieved that the layer arrangement allows more incident light to pass through at the first temperature than at the second temperature. The two temperature-dependent states are referred to below as the transparent state and the dark state respectively. In particular, these applications disclose layer arrangements in which a twisted nematic cell (TN cell) is used. In this case, the switching between the transparent state and the dark state is achieved by a phase transition of the liquid crystalline medium, which is located in the twisted nematic cell, from a nematic state at a temperature below the clearing point to an isotropic state above the clearing point.

In the nematic state, the liquid crystalline medium of the switching layer rotates the plane of polarization of the light through a definable twist angle. Furthermore, the planes of polarization of the polarization layers are rotated through a defined angle with respect to one another, which remains unchanged during the switching operation. If the angle through which the liquid crystalline medium of the switching layer rotates the plane of polarization of polarized light corresponds to the angle through which the planes of polarization of the polarization layers are rotated with respect to one another, the light passing through the first polarization layer and the switching layer can also pass through the second polarization layer. The transparent state of the layer arrangement therefore arises when the nematic state of the liquid crystalline medium of the switching layer arises. Since the nematic state exists at temperatures below the clearing point, the transparent state of the layer arrangement arises at lower temperatures in relative terms.

In the isotropic state, the liquid crystalline medium of the switching layer does not rotate the plane of polarization of the light, meaning that the latter cannot pass through the two polarization layers, whose planes of polarization are rotated with respect to one another. The dark state of the layer arrangement therefore arises when the isotropic state of the liquid crystalline medium of the switching layer arises. Since the isotropic state exists at temperatures above the clearing point, the dark state of the layer arrangement arises at higher temperatures relative to the transparent state.

Investigations which have resulted in the present invention have now shown that the influence which can be achieved with a layer arrangement of this type on the incident light cannot meet all requirements usually arising, in particular in temperate and warm climatic regions.

It is therefore regarded as an object of the present invention to design a layer arrangement of the generic type mentioned at the outset in such a way that the properties which are effective for control of heat transmission are improved.

This object is achieved in accordance with the invention by the provision of a layer arrangement (1) that changes the transmission of incident light depending on its temperature, where the layer arrangement has a first polarization layer (5a), a switching layer (2) which influences the polarization properties of light depending on the temperature, and a second polarization layer (5b), whereby both the first polarization layer (5a) and the second polarization layer (5b) are arranged to affect polarization both in the VIS region and in the NIR region.

Due to the somewhat limited properties of the polarization layers and switching layers which are currently available and which can be employed in an economically sensible manner, a considerable proportion of the NIR light remains substantially non-polarized and is able to pass through a layer arrangement according to prior art substantially unhindered, irrespective of the state of the switching layer, and accordingly is able to enter the interior and heat the interior. Such standard polarization layers which do not polarize NIR light have been used in layer arrangements according to the state of the art, e. g. in US 2009/0015902 and US 2009/0167971.

According to the invention, it has been found that additionally affecting the polarization of the incident light in the NIR region enables for a substantial improvement of the possibilities for controlling the heat transmission through the layer arrangement. The polarized NIR light can then be switched in a temperature-dependent manner by the switching layer, which is only able to influence polarized light, exerting no influence on unpolarized light.

If separate polarization layers are used for affecting the VIS region and the NIR region of the incident light, this allows for a much enhanced ability to control and affect transmission of visible light and heat. Furthermore this might result in reduced manufacturing costs for separate cheap polarization layers when compared to prior art polarization layers with similar qualities in heat management.

By affecting polarization in the VIS region as well as in the NIR region of the transmitted light, a much larger impact on heat transmission can be achieved with less efforts and costs when compared with more costly and less efficient modifications of known polarization layers that mainly affect the VIS region of the incident light.

Also, a larger impact on heat transmission can be achieved at the same reduction of VIS light transmission. Alternatively, the same heat transmission reduction can be achieved at less VIS light reduction, which may be desirable for personal comfort in the interior.

According to an embodiment of the invention it is provided that the first polarization layer (5a) comprises a VIS region affecting polarization layer (3a) and a NIR region affecting polarization layer (4a).

A change of polarization in the VIS region that can be combined with an independent modification of polarization in the NIR region provides for matching and customizing the layer arrangement and the corresponding heat transmission characteristics to many different locations and light conditions. By use of different layers that separately affect polarization in the VIS region and in the NIR region different polarising effects can be used for the different wavelength regions. Different polarising effects result in different polarizing characteristics and properties of the polarizing layers that allow for advantageous heat transmission control possibilities.

The same results can be achieved if it is the second polarization layer (5b) that comprises both a VIS region affecting polarization layer (3b) and a NIR region affecting polarization layer (4b).

The benefits of separate layers affecting the polarization of most of the incident light can be enhanced by an embodiment of the invention whereby the first polarization layer (5a) comprises a VIS region affecting polarization layer (3a) and a NIR region affecting polarization layer (4a) and the second polarization layer (5b) comprises a VIS region affecting polarization layer (3b) and a NIR region affecting polarization layer (4b).

The transmission characteristics within the VIS region and within the NIR region can be affected in a wide range from zero transmission to the transmission of approximately half of the incident light. Due to separate layers the polarization characteristics and the corresponding transmission properties can be determined in a manner most suitable for the expected properties of incident light and heat.

It is likewise conceivable in accordance with an alternative embodiment of the inventive idea and is advantageous for some applications that the first polarization layer (5a)

and/or second polarization layer (5*b*) combines VIS region polarizing properties and NIR region polarizing properties in one polarizing layer.

In a preferable embodiment of the invention, a polarization layer which combines VIS region polarizing properties and NIR region polarizing properties in one polarizing layer is made of multiple layers (7) having different refractive indices. Such polarizing layers can be prepared by methods known in the art and are disclosed e. g. in U.S. Pat. No. 5,882,774 A.

By adding multiple layers of different refractive indices a seemingly single polarization layer can be produced. The properties of the single polarization layer are determined by selection and combination of said layers with different refractive indices as well as by choice of dimensions and characteristics.

The polarization layer which combines VIS region polarizing properties and NIR region polarizing properties in one polarizing layer may comprise a dichroic dye dispersed in a material providing a preferred orientation (8).

It is furthermore provided in accordance with an embodiment of the inventive idea that the first polarization layer (5*a*) comprises a VIS region affecting polarization layer (3*a*) and a NIR region affecting polarization layer (4*a*) and the second polarization layer (5*b*) combines VIS region polarizing properties and NIR region polarizing properties in one polarizing layer.

Likewise, it is also possible that the first polarization layer (5*a*) combines VIS region polarizing properties and NIR region polarizing properties in one polarizing layer and the second polarization layer (5*b*) comprises a VIS region affecting polarization layer (3*b*) and a NIR region affecting polarization layer (4*b*).

For those embodiments as well as for previously described embodiments the preferred choice of first and second polarization layers as well as their alignment with respect to the outer side of a window coating can be adapted to match the heat transmission properties best suited to the common weather conditions at the location of use.

It has proven advantageous for manufacturing such layer arrangements that the switching layer (2) is a twisted nematic liquid crystalline layer. Twisted nematic liquid crystalline layers have been subject to extensive research and experimental investigations. They can be mass-produced by use of cost-efficient manufacturing methods. Due to many different liquid crystalline materials that are suitable for producing and operating twisted nematic liquid crystalline layers a large variety of switching layers with diverse operating characteristics can be realized.

It is conceivable and advantageous with respect to a desired substantial reduction of the heat transmission as well as incident light transmission that the twisted nematic liquid crystalline layer is arranged to switch between a dark state and a transparent state in a first minimum d $\Delta n \sim 0.5$, where d is the thickness of the twisted nematic cell within the switching layer and $\Delta n$ is the optical birefringence. It has been found that operating the twisted nematic liquid crystalline layer in a first minimum with d $\Delta n$ of about 0.5, i.e. d $\Delta n$ having a value between 0.25 and 0.75, preferably between 0.35 and 0.65, more preferably between 0.4 and 0.6, most preferably between 0.45 and 0.55, results in a substantial reduction of transmission in the transparent state in the NIR region that adds to any affection of the polarization and the corresponding reduction of transmission due to the at least one polarization layer.

Such a layer arrangement is suited for use in regions with much incident light that should be reduced even when the twisted nematic liquid crystalline layer is in the transparent state.

According to another embodiment of the invention it is provided that the twisted nematic liquid crystalline layer is arranged to switch between a dark state and a transparent state in a second or higher minimum with d $\Delta n > 0.75$, preferably $>0.8$, more preferably $>0.85$, most preferably $>0.9$.

In the transparent state the twisted nematic liquid crystalline layer with a second or higher minimum d $\Delta n > 0.75$ does not significantly affect the incident light transmission in the NIR region. Therefore, there is a large change of transmission characteristics in the NIR region if the twisted nematic liquid crystalline layer switches between the transparent state and the dark state. This layer arrangement is preferably used in regions where it is desirable to have as much light transmission as possible in the transparent state and to reduce light and heat transmission as much as possible in the dark state of the twisted nematic liquid crystalline layer.

It is likewise conceivable and advantageous that the first polarization layer (5*a*) and/or the second polarization layer (5*b*) comprise an additional VIS region affecting polarization layer (9*a*) and/or (9*b*).

The VIS region affecting polarization layer and the NIR region affecting polarization layer may be combined to a single layer that affects polarization in the VIS region as well as in the NIR region. Due to the combination with an additional VIS region affecting polarization layer the difference in transmission in the VIS region between the transparent state and the dark state is much higher than without the additional VIS region affecting polarization layer.

According to a preferred embodiment of the invention it is provided that the additional VIS region polarization layer (9*a*) and/or (9*b*) is a reflective polarization layer.

According to an alternative preferred embodiment of the invention, the additional VIS region polarization layer (9*a*) and/or (9*b*) is an absorptive polarization layer.

According to the invention, the above-described layer arrangement can be applied to a glass pane (6), e. g. the glass pane of a window.

The layer arrangement is preferably used for the regulation of the transmission of heat and light from the outside into an interior space, e.g. a building, by virtue of its switching capabilities.

Some illustrative embodiments are explained in greater detail below and are depicted in the drawings, in which:

FIGS. 1 to 5 show diagrammatically and by way of example possible embodiments of a layer arrangement (1) according to the invention.

Figure 1:
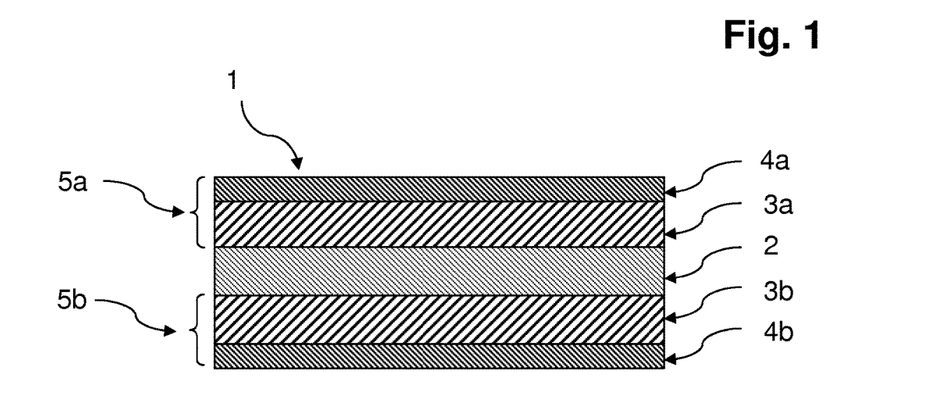
FIG. 1 shows a diagrammatic sectional view through a layer arrangement according to the invention.
Figure 2:
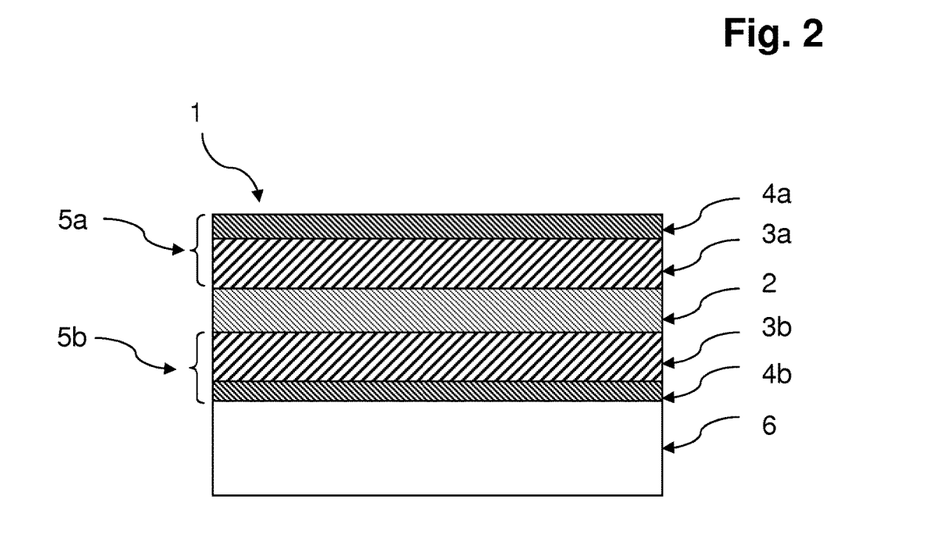
FIG. 2 shows a diagrammatic sectional view through a layer arrangement according to the invention which is arranged on a surface of a glass sheet.

The layer arrangement (1) shown in FIGS. 1 and 2 has a switching layer (2) which influences the polarization properties of light depending on the temperature. The switching layer (2) preferably comprises a liquid crystalline medium which forms a nematic phase in a first temperature range and forms an isotropic phase in a second temperature range. The switching layer (2) is particularly preferably a twisted nematic liquid crystalline cell.

The layer arrangement further comprises two VIS region affecting polarization layers (3a) and (3b) and two NIR region affecting polarization layers (4a) and (4b). A first VIS region affecting polarization layer (3a) and a first NIR region affecting polarization layer (4a) constitute a first polarization layer (5a), and the second VIS region affecting polarization layer (3b) and the second NIR region affecting polarization layer (4b) constitute a second polarization layer (5b).

According to different embodiments of the inventive idea the first polarization layer (5a) and the second polarization layer (5b) may also comprise only a VIS region affecting polarization layer (3a, 3b) or alternatively a NIR region affecting polarization layer (4a, 4b).

Furthermore, it is also a possible embodiment of the invention that the first polarization layer (5a) and the second polarization layer (5b) may comprise a suitable combination of one or more VIS region affecting polarization layers (3a, 3b) as well as one or more NIR region affecting polarization layers (4a, 4b).

Figure 3:
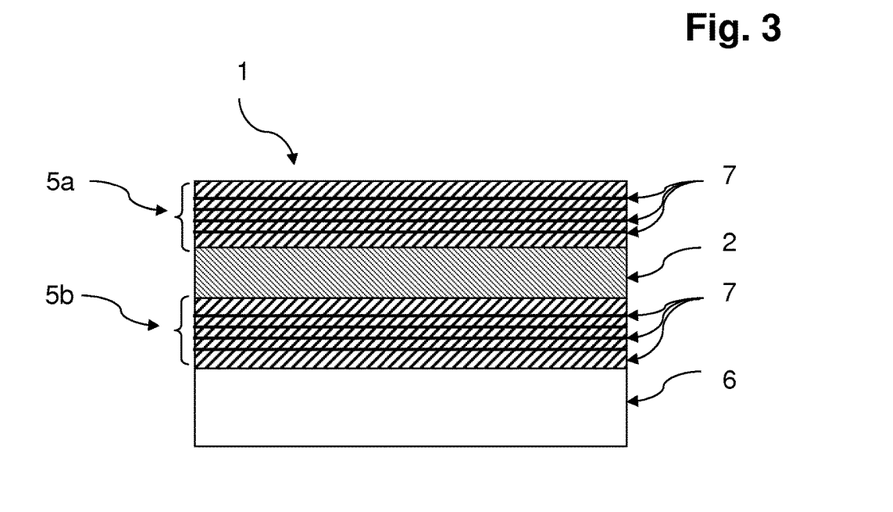
FIG. 3 shows a diagrammatic sectional view through a layer arrangement according to another embodiment of the invention which is arranged on a surface of a glass sheet.
Figure 4:
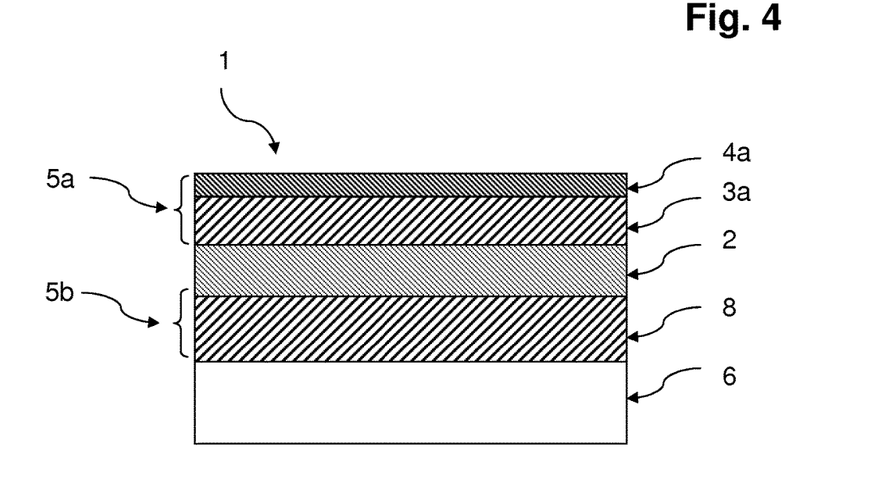
FIG. 4 shows a diagrammatic sectional view through a layer arrangement according to yet another embodiment of the invention which is arranged on a surface of a glass sheet.
Figure 5:
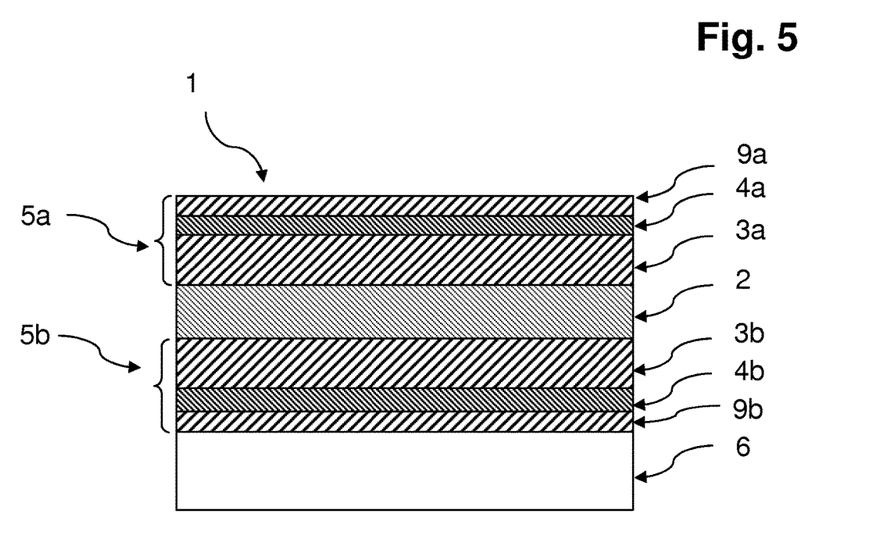
FIG. 5 shows a diagrammatic sectional view through a layer arrangement according to yet another embodiment of the invention which is arranged on a surface of a glass sheet.

Some preferred embodiments of the invention with different configuration of polarization layers (5a) and (5b) are shown in FIGS. 3 to 5.

The polarization properties of a light beam passing through the switching layer are influenced in different ways depending on the temperature. Depending on the composition and structure of the switching layer (2), a first, lower temperature range exists in which the polarization properties of light are changed by the switching layer (2), and a second, higher temperature range exists in which the polarization properties of light are only changed slightly or not at all.

The polarization layers (5a) and (5b) are arranged on each of the two sides of the switching layer (2) respectively and essentially transmit exclusively light having a pre-specified polarization and either reflect (reflective polarization layers) or absorb (absorbent polarization layers) light having a different polarization. The planes of polarization of the two polarization layers (5a) and (5b) are, in accordance with a preferred embodiment, rotated through a certain angle with respect to one another, so that the plane of polarization of light which is prespecified by the first polarization layer (5a) is rotated by the switching layer (2) at a first temperature, and the light can therefore subsequently pass through the second polarization layer (5b) essentially unhindered (transparent state), while the switching layer (2) does not change the plane of polarization of light at a second temperature, and the light can therefore hardly pass through the second polarization layer (5b) or cannot pass through it at all (non-transparent, i.e. dark state).

In accordance with a preferred embodiment, a liquid crystalline state, particularly preferably a nematic state, of the liquid crystalline medium which is present in the switching layer exists at the first temperature. In accordance with a preferred embodiment, an isotropic state of the liquid crystalline medium which is present in the switching layer exists at the second temperature.

In the illustrative embodiment depicted in FIG. 2, the layer arrangement is arranged on a glass pane (6). The glass pane (6) may be a single glass pane which covers an opening in a building or vehicle. However, it may also advantageously be a glass pane comprising a plurality of glass panes of which an insulating glass pane is composed. The layer arrangement (1) is in such cases advantageously arranged on an inside of the outer glass pane, facing the incident light, of the insulating glass pane, since this outer glass pane is in thermal contact with the outside temperature and, in the case of intense incidence of light and high outside temperatures, favours a rapid switching action of the switching layer (2) between the two polarisation layers (5a) and (5b). If the layer arrangement (1) is arranged on a glass pane facing the interior, the switching layer (2) will crucially influence the incident light depending on the interior temperature, so that the temperature-dependent shading is dominated by the interior temperature and not by the outside temperature. In a sequence of three or more glass panes, the layer arrangement (1) may also be arranged on inside glass panes on a surface facing or facing away from the incident light. Furthermore, it is possible for the purposes of the present invention for the glass layer to be replaced by any desired other transparent support layer, for example a plastic layer.

In the embodiment depicted in FIG. 3 the first polarization layer (5a) and the second polarization layer (5b) each are made of multiple layers (7) with different refractive indices, resulting in broadband polarization effect of both layers (5a) and (5b), affecting both the VIS region and the NIR region of the incident light. Such polarizing layers are known in the state of the art, e. g. in U.S. Pat. No. 5,882,774 A.

The layer arrangement shown in FIG. 4 comprises a first polarization layer (5a) with a first VIS region affecting polarization layer (3a) and a first NIR region affecting polarization layer (4a). The second polarization layer (5b) combines VIS region polarizing properties and NIR region polarizing properties in one layer and comprises a dichroic dye dispersed in a material providing a preferred orientation (8).

The layer arrangement according to FIG. 5 comprises a first polarization layer (5a) with a first VIS region affecting polarization layer (3a) and a first NIR region affecting polarization layer (4a). Together with an additional VIS region affecting polarization layer (9a), these constitute a first polarization layer (5a). Likewise, the second polarization layer (5b) with a second VIS region affecting polarization layer (3b) and a second NIR region affecting polarization layer (4b) also comprises an additional VIS region affecting polarization layer (9b).

Figure 6:
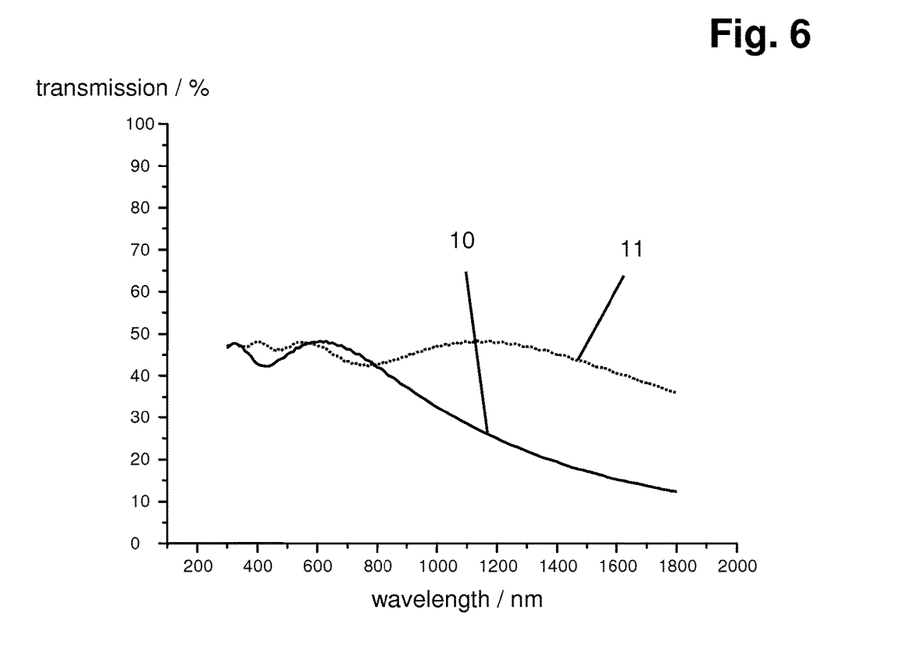
FIG. 6 shows a diagram with the results of spectral measurements of the transmission properties of a switching layer according to the invention in the transparent state between perfect polarizers, where the twisted nematic liquid crystalline layer is arranged to switch between a dark state and a transparent state either in a first minimum d Δn~0.5 or in a second or higher minimum d Δn>0.75.

The schematic measurement results from FIG. 6 clarify the difference in transmission characteristics between the layer arrangement (1) where the switching layer (2) is arranged to switch between a dark state and a transparent state in a first minimum with d Δn~0.5, as shown with the solid line (10), and the layer arrangement (1) where the switching layer (2) is arranged to switch between a dark state and a transparent state in a second or higher minimum with d Δn>0.75, as shown with the dashed line (11). Both lines show the transparent state of the device between perfect polarizers. The transparent state in a first minimum with d Δn~0.5 clearly shows lower transmission in the NIR region when compared to the transparent state in a second or higher minimum with d Δn>0.75. Due to the high transmission reduction in the NIR region even in the transparent state, the arrangement of the switching layer (2) in a first minimum with d Δn~0.5 is suitable for use in a region with high incident light luminosity and a continuous need for heat transmission reduction. By contrast, the layer arrangement (1) where the switching layer (2) is arranged to switch between a dark state and a transparent state in a second or higher minimum with d Δn>0.75 is preferably used in a region where a large difference in energy transmission between the transparent state and the dark state is preferred over a static strong heat transmission reduction.

Figure 7:
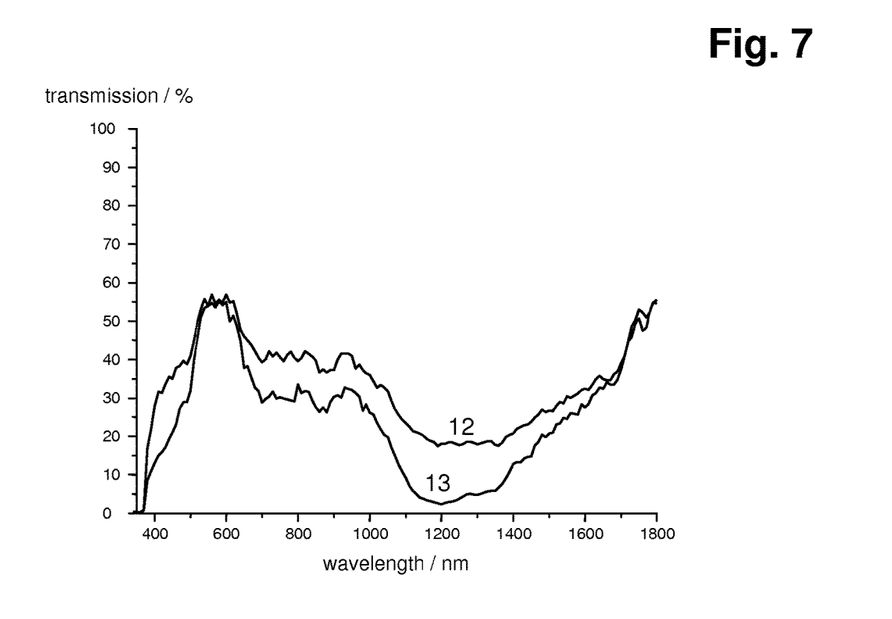
FIG. 7 shows a diagram with the results of spectral measurements of the transmission properties of a layer arrangement where a first polarization layer and a second polarization layer each combine VIS region polarizing properties and NIR region polarizing properties in one layer, and where a switching layer is in a first minimum with d Δn~0.5.
Figure 8:
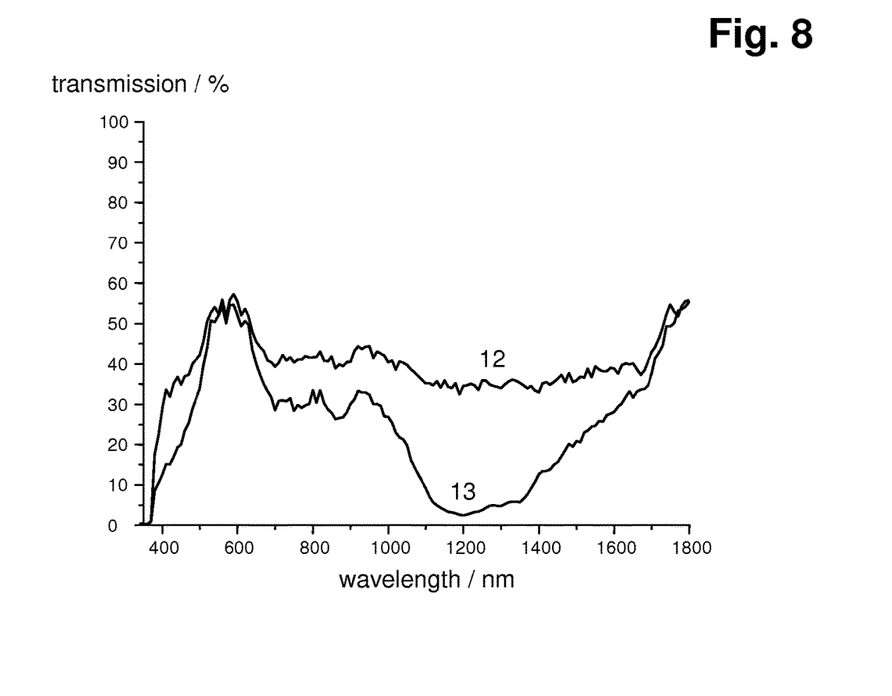
FIG. 8 shows a diagram with the results of spectral measurements of the transmission properties of a layer arrangement according to FIG. 7 where the switching layer is in a second minimum with d Δn>0.75.

FIG. 7 and FIG. 8 show the results of a spectral transmission measurement of a layer arrangement (1) whereby the first polarization layer (5a) and the second polarization layer (5b) each consist of a polarization layer that is made of multiple layers (7) having different refractive indices. Such a configuration of first and second polarization layer (5a) and (5b) is shown in FIG. 3. It can be seen that for the VIS region the difference between the transparent state (12) and the dark state (13) is quite small, in the first minimum as shown in FIG. 7 as well as in the second minimum as shown in FIG. 8. The NIR region however shows an important effect: The difference in transmission between transparent state (12) and dark state (13) in the NIR region is smaller in case of the first minimum, as can be verified in FIG. 7, and significantly larger in case of the second minimum of the switching layer, as shown in FIG. 8.

Figure 9:
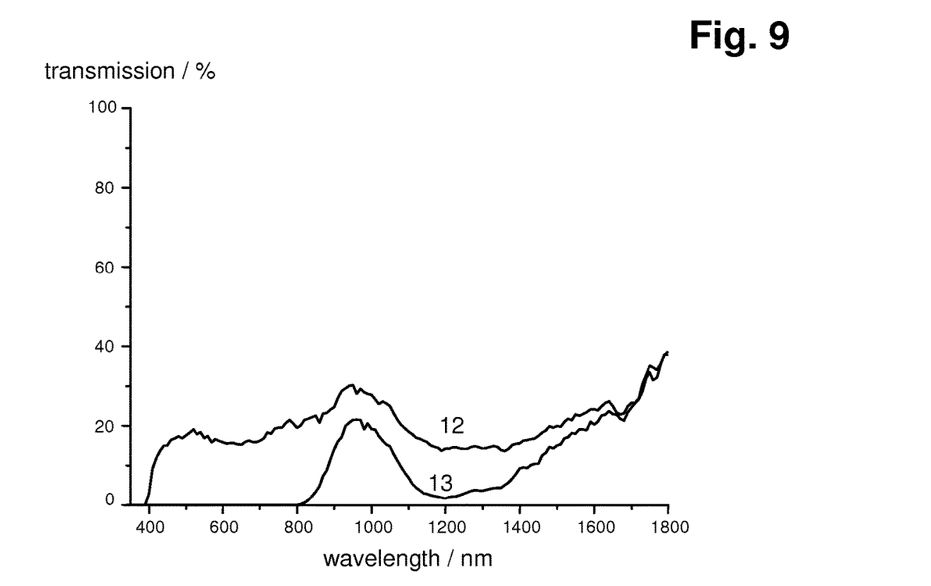
FIG. 9 shows a diagram with the results of spectral measurements of the transmission properties of a layer arrangement where an additional VIS region affecting polarization layer is present both in the first polarization layer and in the second polarization layer, and where a switching layer is in a first minimum with d Δn~0.5.
Figure 10:
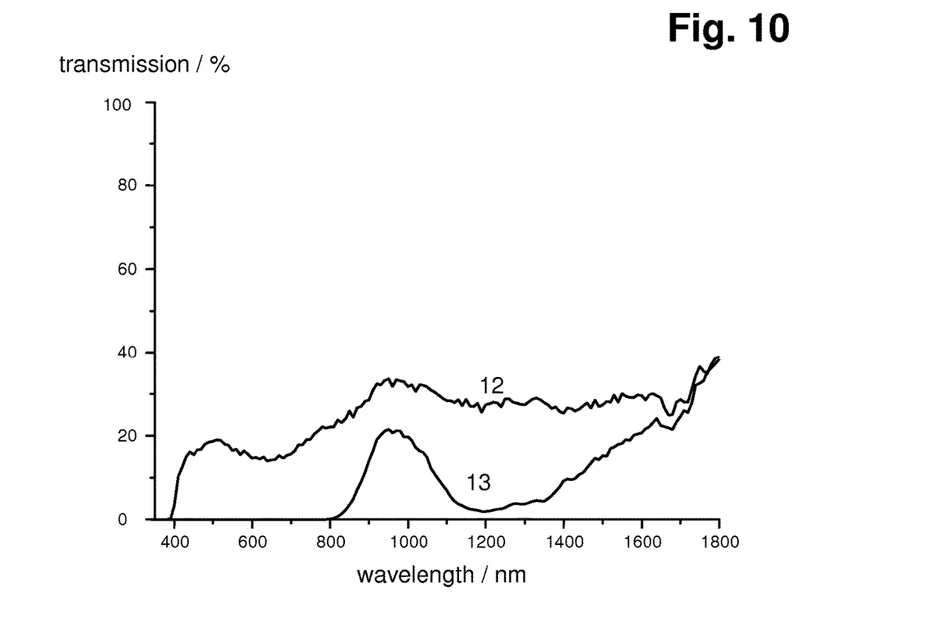
FIG. 10 shows a diagram with the results of spectral measurements of the transmission properties of a layer arrangement according to FIG. 9 where the switching layer is in a second minimum with d Δn>0.75.

If an additional VIS region affecting polarization layer (9a, 9b) is added both to the first polarization layer (5a) and to the second polarization layer (5b), the transmission in the VIS region is considerably reduced. Such a configuration of the layer arrangement is schematically shown in FIG. 5. Corresponding spectral measurements are shown in FIG. 9 for the switching layer (2) arranged to switch between a dark state and a transparent state in a first minimum with d Δn~0.5, and in FIG. 10 where the switching layer (2) is arranged to switch between a dark state and a transparent state in a second or higher minimum with d Δn>0.75. In both cases the transmission is generally relatively low in the VIS region and in the NIR region but there is a larger difference in transmission between the transparent state (12) and the dark state (13) for the case of FIG. 10, where the switching layer (2) is operated in the second minimum, than for the case of FIG. 9, where the switching layer (2) is operated in the first minimum. In both layer arrangements of FIG. 9 and FIG. 10, an ITOS XP-38 polarizer is used as a VIS region polarizing layer (9a, 9b).

The invention claimed is:

1. Layer arrangement (1) which changes the transmission of incident light depending on its temperature, where the layer arrangement (1) has a first polarization layer (5a), a switching layer (2) which influences the polarization properties of light depending on the temperature, and a second polarization layer (5b),
    wherein both the first polarization layer (5a) and the second polarization layer (5b) are arranged to affect polarization both in the VIS region and in the NIR region,
    wherein the first polarization layer (5a) comprises a VIS region affecting polarization layer (3a) and a NIR region affecting polarization layer (4a),
    wherein the second polarization layer (5b) combines VIS region polarizing properties and NIR region polarizing properties in one polarizing layer which comprises a dichroic dye dispersed in a material providing orientation (8),
    wherein the switching layer (2) is arranged to switch between a transparent state in a first temperature range and a dark state in a second temperature range, and
    wherein, in the dark state, the switching layer is in an isotropic state and, in the transparent state, the switching layer is a twisted nematic liquid crystalline layer.

2. Layer arrangement according to claim 1, wherein the first polarization layer (5a) and/or the second polarization layer (5b) comprise an additional VIS region affecting polarization layer (9a, 9b).

3. Layer arrangement according to claim 1, wherein the layer arrangement is applied to a glass pane (6).

4. A method for the regulation of the transmission of light and heat from the outside into an interior space, which comprises providing a layer arrangement according to claim 1 between the outside and the interior space.

* * * * *